United States Patent [19]

Pahlén

[11] 4,417,596
[45] Nov. 29, 1983

[54] PORTABLE APPARATUS FOR CLEANING RE-USABLE FILTERS

[76] Inventor: Bo Pahlén, Älvhagsvägen 11, S-194 53 Upplands Väsby, Sweden

[21] Appl. No.: 300,930

[22] Filed: Sep. 10, 1981

[30] Foreign Application Priority Data

Sep. 15, 1980 [SE] Sweden ............................. 8006448

[51] Int. Cl.³ .............................................. B08B 9/00
[52] U.S. Cl. .................................. 134/152; 134/156; 134/170; 134/199; 68/213
[58] Field of Search .................. 134/152, 156, 166 C, 134/170, 172, 198, 199; 68/213

[56] References Cited

U.S. PATENT DOCUMENTS

| | | | |
|---|---|---|---|
| 2,211,892 | 8/1940 | Giese | 134/170 |
| 2,289,312 | 7/1942 | Whitesell | 134/156 X |
| 3,568,414 | 3/1971 | Spriggs et al. | 55/294 |
| 3,583,413 | 6/1971 | Mertzanis | 134/199 X |
| 3,620,234 | 11/1971 | Everroad | 134/86 |
| 3,820,552 | 6/1974 | Lang et al. | 134/172 X |
| 4,049,555 | 9/1977 | Matherne | 134/93 X |

FOREIGN PATENT DOCUMENTS 117537 11/1946 Sweden ............................. 134/156
677780 8/1979 U.S.S.R. ............................ 134/156

Primary Examiner—Robert L. Bleutge
Attorney, Agent, or Firm—Hammond & Littell, Weissenberger and Muserlian

[57] ABSTRACT

A filter-cleaning apparatus comprises a hollow, elongate body provided with cleaning fluid inlet and exit means at respective ends thereof. The cleaning fluid inlet means comprises an annulus which extends peripherally around one end of the hollow body and which defines together with the outer wall of the hollow body a space for receiving cleansing fluid from a source of such fluid. The interior of the hollow body communicates with the space defined by the annulus through a series if holes formed in that part of the wall of the body located within the confines of the space. When cleaning a filter, the filter is inserted into the hollow body through the inlet means herefore and the source of cleaning fluid activated. The filter is then moved axially in the hollow body, past the series of holes, until all the filter has been cleaned. A closure means is provided at the cleaning fluid inlet, to prevent the escape of cleaning fluid during operation.

4 Claims, 3 Drawing Figures

PORTABLE APPARATUS FOR CLEANING RE-USABLE FILTERS

The present invention relates to an apparatus for cleaning re-usable filters, particularly filters of tubular configuration and exhibiting pleated or bellows-like filter surfaces, said apparatus comprising an elongate hollow body within which the filter is cleaned and the interior of which is arranged to receive a cleaning fluid, for example water, from an external source, and which body is provided with means for discharging used cleaning fluid during a filter-cleaning operation.

Practically every swimming pool, whether large or small, is equipped with a filter means, which more often than not can be used repeatedly to cleanse the water of the pool. These filters may be of mutually different configurations and the number used in respective installations may vary, in accordance with the size of the pool for example. A general filter means used at the present time comprises an elongate body which is of circular cross-section and which has pleated or bellows-like filter surfaces made from a special permeable material. A plurality of these filter means are combined to form a filter unit or package and mounted in a separate filter housing. These filters, referred to in the vernacular as filter cartridges, need to be cleaned at substantially regular intervals. Thus, certain filters are provided with an instrument which indicates when the pressure has reached a given maximum, therewith signalling a reduction in the flow through the filter as a result of clogging.

One conventional method of cleaning a filter cartridge involves directing a jet of water from a conventional hose pipe on to the cartridge and allowing the jet of water to wash away the filter-clogging impurities at normal mains pressure. Since the person practicing this method is exposed to a lot of water, he or she must either wear waterproof clothing or a bathing costume.

Apparatus for cleaning filters enclosed in a housing are also known to the art. For example, Swedish Patent Specification No. 117.537 discloses a filter-cleaning means which is combined with the normal usage site of the filter. In addition to this older filter-cleaning means being mechanically complicated, its practical use would also seem to be complicated. It is also stationary, which may present a problem.

The U.S. Pat. No. 3,620,234 describes a complicated, stationary apparatus for cleaning air filters, while U.S. Pat. No. 3,568,414 describes an apparatus for cleaning fluid filters. A method of cleaning square filters is taught in U.S. Pat. No. 4,049,555. A common disadvantage with these known filter-cleaners is their complex construction, which renders them expensive. Another disadvantage is the number of complicated procedural steps which must be undertaken before a filter operation can commence.

Consequently, an object of the present invention is to provide a portable filter-cleaning apparatus which is both inexpensive and of simple design and with which the filter cartridges of a filter unit can be thoroughly cleaned.

To this end it is proposed that in an apparatus of the aforedescribed kind the elongate hollow body is provided with at least one transversally and peripherally extending flange having a circular cross-section, so arranged as to form a space between the inner wall of the flange and the outer wall of said body, and that the flange is provided with a through-passing opening which forms, an inlet for cleaning liquid; and that the hollow body is provided around its periphery with a plurality of openings through which said space communicates with the interior of the hollow body so that a tubular filter cartridge can be cleaned by the action of said flowing cleaning fluid, by moving said cartridge manually axially within the hollow body by means of a detachable handle. To provide for this axial movement, the cartridge may be provided with means for receiving a detachable handle by which the cartridge can be held and inserted into and moved along the hollow body.

An apparatus of this kind requires but little space, and all that need be done to clean a filter of the aforesaid kind for re-use is to connect the inlet to a source of cleaning fluid under pressure, for example a watermains connected hose and move the cartridge axially a few times within the hollow body.

In accordance with a further embodiment of the novel apparatus, there is conveniently provided an elongate spring which extends axially through the hollow body and one end part of which forms a seating for a peg arranged to co-act with an opposing end of the filter cartridge for guiding the axial movement thereof.

This peg and spring arrangement affords axial guidance of the cartridge as it moves axially along the hollow body and causes the cartridge to return automatically to a starting position.

An exemplary, preferred embodiment of the invention will now be described in more detail with reference to the accompanying schematic drawings, of which FIG. 1 is an axial sectional view of a filter-cleaning apparatus according to the invention;

Figure 1:
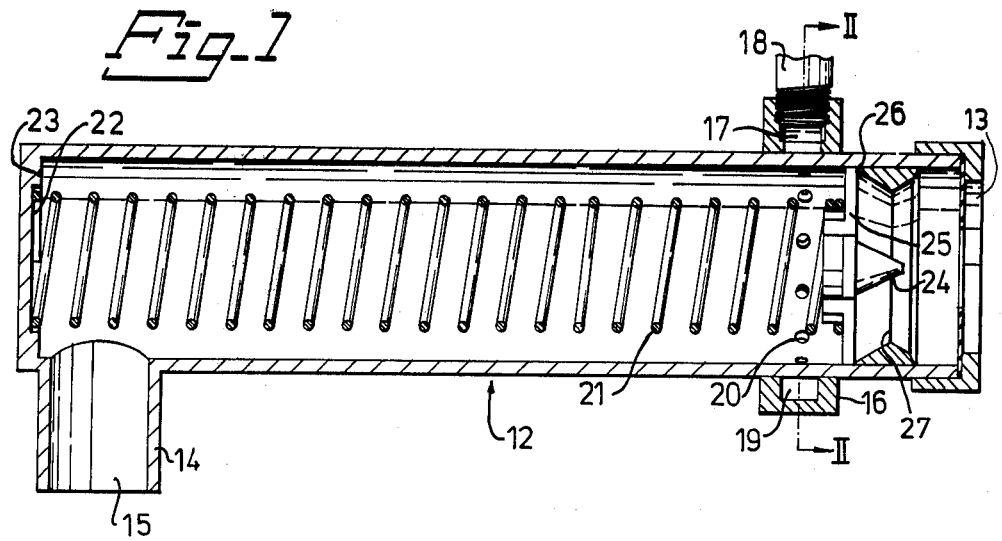
Figure 2:
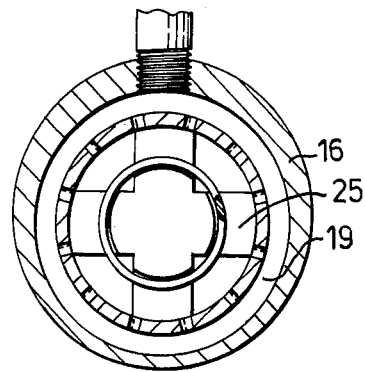
FIG. 2 is a view taken on the line II—II in FIG. 1.
Figure 3:
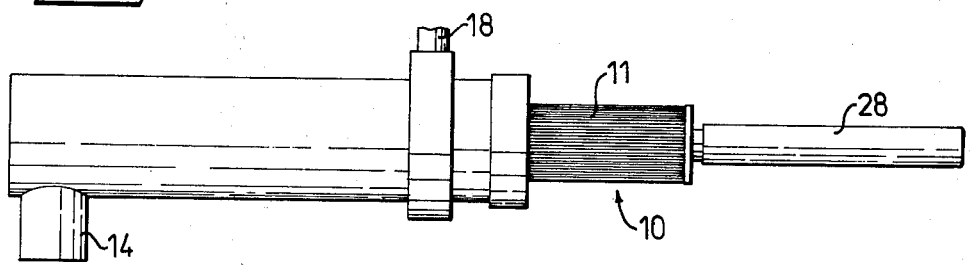
FIG. 3 illustrates the apparatus of FIG. 1 with a filter cartridge inserted partially into the hollow body of said apparatus.

In the drawings, the reference 10 identifies a tubular filter of circular cross-section, having pleated or bellows-like filter surfaces 11. The nature and construction of the filter has no part to play in the present invention, however, and the filter surfaces may thus be of other design.

The illustrated filter-cleaning apparatus comprises a hollow tubular body 12 made of a suitable material and having a filter-inlet opening 13 at one end thereof. The body 12, which may have any desired cross-sectional shape, is of cylindrical configuration in the illustrated embodiment and is provided with a downwardly extending, radial stub 14, which forms a discharge means 15 for consumed cleansing fluid, as will be explained hereinafter.

At the end remote from the stub 14, the hollow body 12 is provided with a radially extending, hollow-tubular flange 16 which encircles said hollow body. The flange annulus 16 has arranged in a wall thereof a lateral, through passing opening 17 which forms an inlet for the filter-cleaning fluid, which may be water. In the illustrated embodiment, the opening 17 is provided with a screw thread for meshing with a corresponding screw thread of a bush 18, by means of which the apparatus can be connected to the water mains via a suitable hose.

Arranged around the periphery of the hollow body 12, within the confines of the annular space 19 defined by the walls of flange 16, is a ring of holes 20 through which the space 19 communicates with the interior of the hollow body 12.

Arranged axially in the hollow body 12 is a spring 21, one end of which rests in a U-shaped seat 22 on the end 23 of said hollow body, and the other end of which forms a seat for an axially extending, conical peg 24. The peg 24 has radial surfaces 25 arranged to abut an edge surface 24, thereby to limit axial movement of the peg 26 and spring 21. In the position illustrated in FIG. 1, the spring 21 has a given pre-tensioning, and it will be seen that the underside of the surfaces 25 form abutments for the end of the spring 21 remote from the stub 14. The end of the hollow body remote from said stub is also provided with an annulus of plastically deformable elements, for example in the form of tags or flaps 27, which border the filter-inlet opening 13 and which prevent fluid escaping from the body 12 in operation.

When using the novel apparatus to clean a tubular filter cartridge 10, a detachable handle 28 is attached to one end of the cartridge 10. The cartridge 10 is then inserted through the opening 13, so that the peg 24 is accomodated in the end of the filter remote from the handle. When the source of cleaning fluid is switched on, in this case a water tap, water will enter the space 19 and have a rotary movement imparted thereto. Water will then enter the hollow body 12 through holes 20. By moving the cartridge 10 through the hollow body 12, which body is preferably positioned vertically when in use, that area of the filter located in the vicinity of the space 19 will be subjected to a cleaning action by the fluid issuing from the holes 20, and all that is required in order to clean the whole of the filter is to move the cartridge axially through the hollow body a few times in both directions. Subsequent to being cleaned, the filter cartridge is returned to its allotted place in the filter unit or housing.

It will be obvious to those skilled in this art that a plurality of flanges 16 can be arranged sequentially along the hollow body 12, although this would unnecessarily complicate the construction. The used cleaning fluid is discharged through the outlet 14,15.

I claim:
1. An apparatus for cleaning a re-usable filter, particularly a filter of tubular configuration and exhibiting pleated or bellows-like filter surfaces, said apparatus comprising a hollow body within which the filter is intended to be cleaned and the interior of which is arranged to receive a cleaning fluid, such as water, from an external source, and which body is provided with means for discharging used cleaning fluid during a filter cleaning operation, characterized in that the hollow body is provided with at least one transversally and peripherally extending flange having a circular cross section, so arranged as to form a space between the inner wall of the flange and the outer wall of said body, and that the flange is provided with a through-passing opening which forms an inlet for cleaning liquid and that the hollow body is provided around its periphery with a plurality of openings through which said space communicates with the interior of the hollow body so that a tubular filter cartridge can be cleaned by the action of said flowing cleaning fluid, by moving said cartridge manually axially with in the hollow body by means of a detachable handle.

2. An apparatus according to claim 1, in which the hollow body has a filter inlet opening, and in which a plastically deformable element is provided in said filter inlet opening to prevent the escape of cleansing fluid through said opening during a filter-cleaning operation.

3. An apparatus according to claim 1, in which a spring extends axially within the hollow body, and in which one end of the spring forms a seating for a peg arranged to co-act with one end of the tubular filter to form a guide therefor.

4. An apparatus according to claim 3, in which the peg in conical and is connected to radially extending surfaces forming abutments for co-action with edge surfaces for restricting the axial movement of the peg and the spring.

* * * * *